United States Patent
Chakrabarti et al.

(10) Patent No.: US 8,120,306 B2
(45) Date of Patent: Feb. 21, 2012

(54) VOLTAGE SOURCE INVERTER WITH A VOLTAGE OFFSET

(75) Inventors: Sibaprasad Chakrabarti, Torrance, CA (US); Rajkumar Copparapu, Boxborough, MA (US)

(73) Assignee: GM Global Technology Operations LLC, Detroit, MI (US)

( * ) Notice: Subject to any disclaimer, the term of this patent is extended or adjusted under 35 U.S.C. 154(b) by 523 days.

(21) Appl. No.: 12/348,422

(22) Filed: Jan. 5, 2009

(65) Prior Publication Data

US 2010/0171456 A1    Jul. 8, 2010

(51) Int. Cl.
*H02P 27/04* (2006.01)

(52) U.S. Cl. ......... 318/803; 363/98; 363/41; 363/44; 363/34; 363/45; 363/46; 363/53; 363/55; 363/56.01; 363/56.02; 363/56.03; 363/56.05; 363/132; 318/801; 318/811; 318/606; 318/607; 323/217; 323/311; 323/345; 323/276; 361/24; 361/1

(58) Field of Classification Search ......... 318/461, 318/445, 800, 801, 811, 778, 471, 599, 807, 318/808, 606, 607; 363/41, 13, 17, 21.03, 363/21.01, 21.11, 37, 74, 131, 132, 44, 34, 363/45, 46, 53, 55, 56.01, 56.02, 56.03, 56.05; 323/217, 311, 265, 345
See application file for complete search history.

(56) References Cited

U.S. PATENT DOCUMENTS

| | | | | |
|---|---|---|---|---|
| 4,833,584 | A * | 5/1989 | Divan | 363/37 |
| 6,313,602 | B1 * | 11/2001 | Arefeen et al. | 318/801 |
| 6,337,804 | B1 * | 1/2002 | Kea et al. | 363/132 |
| 6,643,149 | B2 * | 11/2003 | Arnet et al. | 363/41 |
| 7,061,134 | B2 * | 6/2006 | Hiti et al. | 290/44 |
| 7,190,599 | B2 * | 3/2007 | Virolainen et al. | 363/98 |
| 7,443,116 | B2 * | 10/2008 | Kutsuna et al. | 318/139 |
| 7,616,466 | B2 * | 11/2009 | Chakrabarti et al. | 363/132 |

OTHER PUBLICATIONS

Prasad, V. H., "Analysis and comparison of space vector modulation schemes for three-leg and four-leg voltage source inverters," Thesis for the degree of Master of Science in Electrical Engineering, May 15, 1997, Chapter 2, pp. 4-26.

* cited by examiner

*Primary Examiner* — Rita Leykin
(74) *Attorney, Agent, or Firm* — Ingrassia Fisher & Lorenz, P.C.

(57) ABSTRACT

Methods and apparatus are provided for operation of a voltage source inverter. A method of operating a voltage source inverter having an output with multiple voltage phases having a DC voltage level, the method comprising sensing a low output frequency condition; determining a DC voltage offset responsive to the low output frequency condition; and applying the DC voltage offset when operating the voltage source inverter resulting in a change to the DC voltage level of the multiple voltage phases.

20 Claims, 3 Drawing Sheets

VOLTAGE SOURCE INVERTER WITH A VOLTAGE OFFSET

TECHNICAL FIELD

The technical field generally relates to voltage source inverters, such as those used in electric or hybrid electric vehicles.

BACKGROUND

Voltage source inverters are increasingly utilized in many applications, such as, for example, motor drive systems for electric vehicles or hybrid-electric vehicles within automotive applications. In these applications, a voltage source inverter (VSI) may supply an alternating current (AC) to a dependent device, such as, for example, an AC motor.

Thermal management issues concerning power switches within the voltage source inverter (VSI) may arise when the VSI operates at low or zero output frequency; that is, when the VSI is applying zero or low voltage across the phases while receiving a constant direct current (DC) link voltage, referred to as input voltage. When operating at low or zero output frequency, the average voltage produced by the VSI is low in comparison to the DC link voltage, while the output current might be the switch rated current.

Thermal management issues can arise at zero or low output frequency due to slowly changing AC current. That is, under these conditions, a power switch in the VSI might be required to carry maximum rated current continuously or for a very long period, causing relatively constant high power dissipation inside the power switch. This condition represents a worst-case operating condition for a switch in the VSI. A conventional solution is to time-limit the VSI operation at zero or low output frequency and full output current. Unfortunately, this conventional solution can be problematic for electric and hybrid vehicle operation because it generally limits the time during which maximum torque can be applied to the electric motor during vehicle start. Another conventional solution is to use pulse width modulation with a switching frequency where the phase with the highest phase current is not switched, but is held at the rail voltage for a period of time to reduce losses in switching. This conventional solution increases noise (called "current ripple") in the output voltage. A higher switching frequency may be used to reduce current ripple, but the higher switching frequency adds to switching losses in the phases that are switched.

In view of the foregoing, it would be desirable to provide a system that would overcome these and other disadvantages and improve existing voltage source inverters and operation of voltage source inverters. Accordingly, it is desirable to increase VSI current capability at low output frequencies. In addition, it is desirable to provide a suitable current ripple. Furthermore, other desirable features and characteristics will become apparent from the summary and subsequent detailed description and the appended claims, taken in conjunction with the accompanying drawings and this background.

SUMMARY

A voltage source inverter is provided for improved operation during low output frequency conditions. The voltage source inverter comprising a set of inverter branches, each branch comprising a set of switches and a set of diodes and each branch configured to provide a phase of a modulated output voltage with a DC voltage level. The voltage source inverter includes a voltage source inverter control comprising a system controller, switch controllers and a data source. The system controller is configured to determine a low output frequency condition, and to determine a DC voltage offset responsive to the low output frequency condition. The system controller applies the DC voltage offset resulting in a change to the DC voltage level of the modulated output voltages during the low output frequency condition. The switch controllers are communicatively coupled to the system controller and configured to operate the set of switches in the set of inverter branches using a pulse width modulation technique. The data source is communicatively coupled to the system controller.

A method is provided for operating a voltage source inverter having an output with multiple voltage phases having a DC voltage level. The method comprises sensing a low output frequency condition and determining a DC voltage offset responsive to the low output frequency condition. The method includes applying the DC voltage offset when operating the voltage source inverter resulting in a change to the DC voltage level of the multiple voltage phases.

BRIEF DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or the following detailed description.

Figure 1:
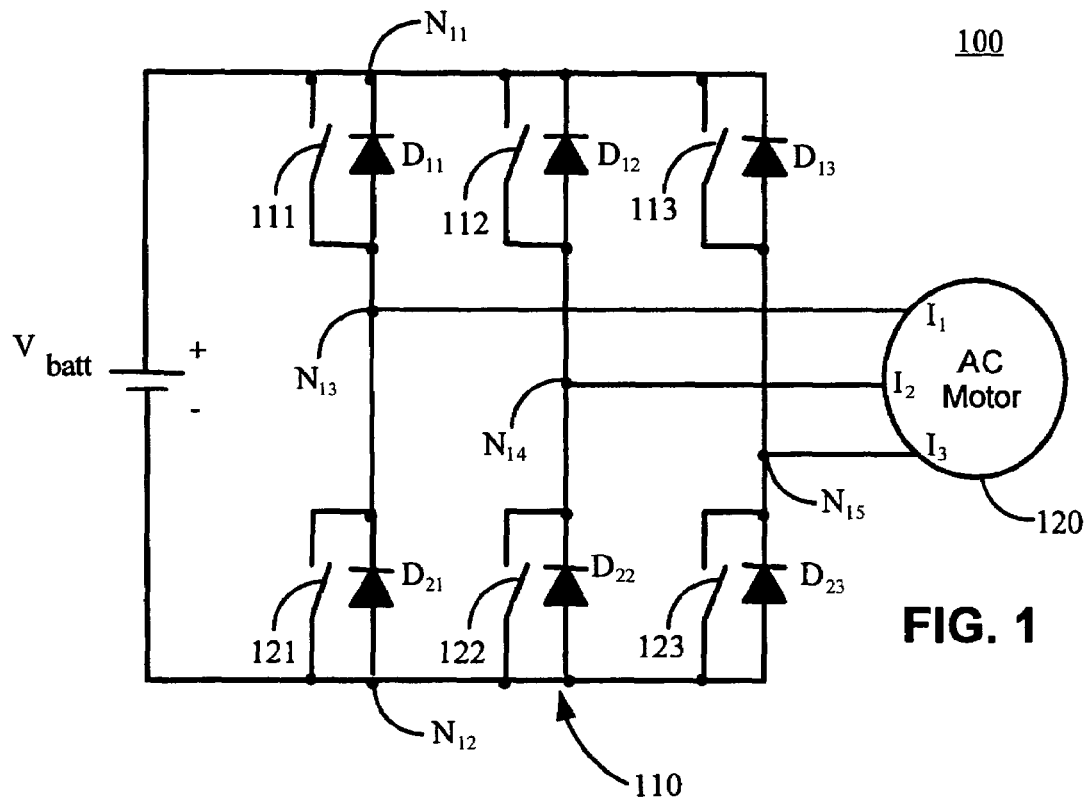
FIG. 1 is a schematic diagram illustrating a motor drive system.

FIG. 1 is a schematic diagram illustrating a motor drive system 100 including a voltage source inverter 110 and an AC motor 120. Voltage source inverter 110 is a conventional voltage source inverter and includes power supply ($V_{batt}$), diodes ($D_{11}$-$D_{23}$), and switches (111-123). Nodes ($N_{11}$-$N_{15}$) are additionally included for discussion purposes.

Power supply ($V_{batt}$) includes a positive (+) terminal 130 and a negative (−) terminal 140. The positive terminal 130 is coupled to node $N_{11}$ and the negative terminal 140 is coupled to node $N_{12}$. Diode $D_{11}$ includes a cathode coupled to node $N_{11}$ and an anode coupled to node $N_{13}$. Diode $D_{12}$ includes a cathode coupled to node $N_{11}$ and an anode coupled to node $N_{14}$. Diode $D_{13}$ includes a cathode coupled to node $N_{11}$ and an anode coupled to node $N_{15}$. Diode $D_{21}$ includes a cathode coupled to node $N_{13}$ and an anode coupled to node $N_{12}$. Diode $D_{22}$ includes a cathode coupled to node $N_{14}$ and an anode coupled to node $N_{12}$. Diode $D_{23}$ includes a cathode coupled to node $N_{15}$ and an anode coupled to node $N_{12}$.

Each diode ($D_{11}$-$D_{23}$) has an associated switch (111-123) located in parallel to the associated diode. The combination of a diode and an associated switch is called a power switch. The power switch, formed in this way, can carry current in two directions and can block the voltage in one direction. Two power switches are grouped together to form an inverter branch. In an example, and referring to FIG. 1, three branches are formed within voltage source inverter 110.

The switches (111-123) are adapted to control current flow within a portion of each branch of voltage source inverter 110. Switches (111-113) are called upper switches. Switches (121-123) are called lower switches. In one embodiment switches (111-123) are software controlled utilizing Space Vector Modulation (SVM) with a DC voltage offset methodology as will be subsequently discussed in greater detail. Other control methods may be used in other embodiments.

AC motor 120 includes three terminals ($I_1$, $I_2$, and $I_3$). Terminal $I_1$ is coupled to node $N_{13}$, terminal $I_2$ is coupled to node $N_{14}$, and terminal $I_3$ is coupled to node $N_{15}$. AC motor 120 receives an AC voltage input from voltage source inverter 110 and produces a mechanical output based on the AC input.

In an exemplary embodiment, voltage source inverter 110 includes six current bidirectional, voltage unidirectional power switches with one switch within each branch open while the other switch is closed within the branch. Closing the switch allows current to flow within a portion of the branch. In an example, and referring to FIG. 1, closing switch 111 allows current to flow from power supply $V_{batt}$ to Terminal $I_1$ via node $N_{13}$. Alternatively, closing the switch could allow current to flow in the opposite direction from Terminal $I_1$ to supply $V_{batt}$, via node $N_{13}$, depending upon motor operating conditions. In one embodiment each of the power switches has a switch such as an insulated gate bipolar transistor (IGBT) with an operating temperature range and a maximum operating temperature that in part determines a maximum current through the IGBT. The diode in each power switch may be a high temperature diode that also has an operating temperature range that in part determines a maximum current through the diode. In one exemplary embodiment, the power switch includes the IGBT and the diode in the same substrate with different operating temperature ranges for the two components. In other embodiments, components of a power switch may be separate discrete components, and may have similar operating temperatures ranges or different operating temperature ranges.

In one embodiment, a pulse width modulation (PWM) technique is utilized to control the per-cycle average, output voltage magnitude and output frequency. The power switches operate at a switching frequency while the switch duty cycles are modulated to produce three-phase voltages of desired magnitude and output frequency. In an exemplary embodiment a DC offset is applied to the three-phase voltages using the PWM technique to result in a higher output current capability of the VSI during low output frequency conditions. The switching frequency may be a constant frequency, or it may vary.

Figure 2:
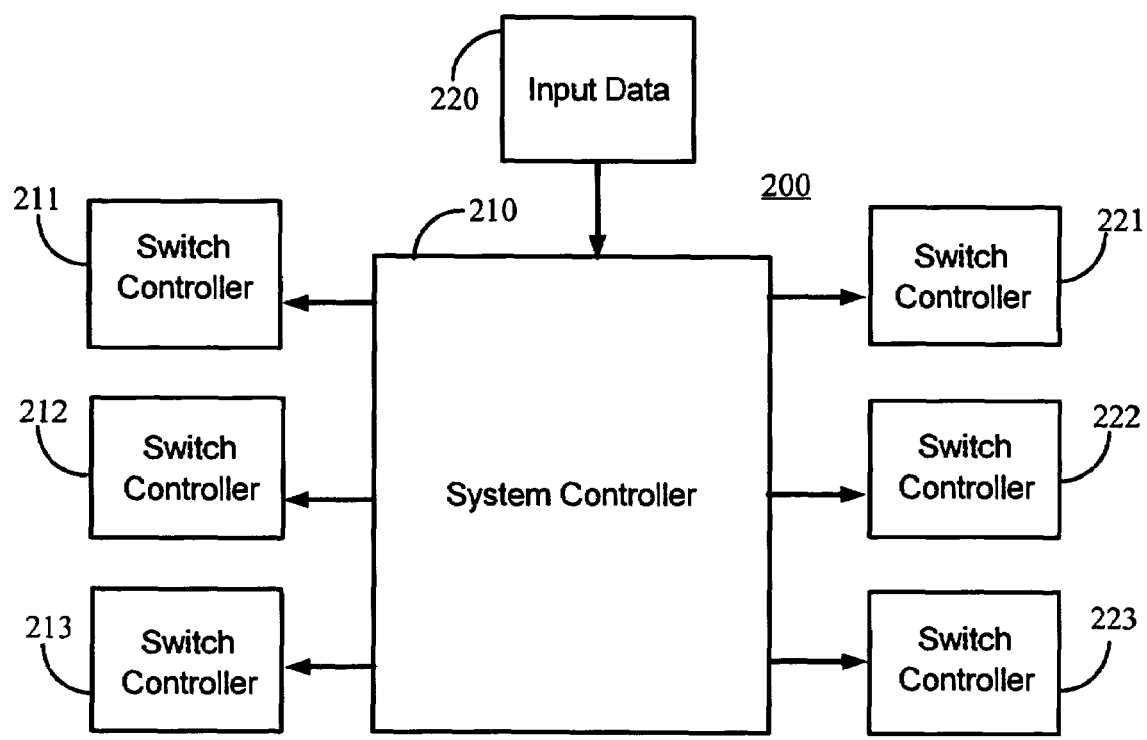
FIG. 2 is a block diagram illustrating a voltage source inverter control circuit according to an exemplary embodiment.

FIG. 2 is a block diagram illustrating a voltage source inverter control circuit 200 according to an exemplary embodiment. Voltage source inverter control circuit 200 includes system controller 210, switch controllers (211-223), and a data input 220. In one embodiment, each switch controller controls an associated switch within a voltage source inverter.

System controller 210 is a control device designed to monitor and receive data from various sources. Data input 220, for example, may process the received data and transmit control signals to switch controllers (211-223) based on the received processed data. In one embodiment, system controller 210 is a digital controller and includes hardware and software necessary to receive a pulse width modulated signal, including digital instructions for operation of power switches, and producing individual power switch control signals based on the received pulse width modulated signal. Output voltages for each of the three phases of the VSI may be represented by digital values. In an exemplary embodiment the system controller determines a DC-offset and applies the DC-offset by changing the digital values representing output voltages for the three phases.

In an example and referring to FIGS. 1 and 2, system controller 210 is implemented as a processing unit and includes accompanying devices, such as PROMs, and software programming enabling the processing unit to conduct operations. In one embodiment, system controller 210 includes a database having a space vector structure defining a switching space vector associated with switches within each branch for any given switching combination. In this example, the database is implemented as a lookup table. In another embodiment, system controller 210 includes a database related to sinusoidal pulse width modulation used in controlling the switches within each branch to produce output voltages. In various embodiments the system controller 210 may determine a DC offset to increase the output current of the VSI, and apply the DC offset to the output voltage in each branch during a low output frequency condition.

Switch controllers (211-223) are control devices designed to receive control signals from system controller 210 and implement the control signals within an associated power switch. In one embodiment, switch controllers (211-223) include hardware and software necessary to implement power switch control signals received from system controller 210. In an example and referring to FIG. 1, each switch controller (211-223) controls an associated power switch combination. In this example, switch controller 211 provides a power switch control signal to the power switch combination of switch 111 and diode $D_{11}$. Similarly, the remaining switch controllers each provide a power switch control signal to the associated power switch combination.

Figure 3:
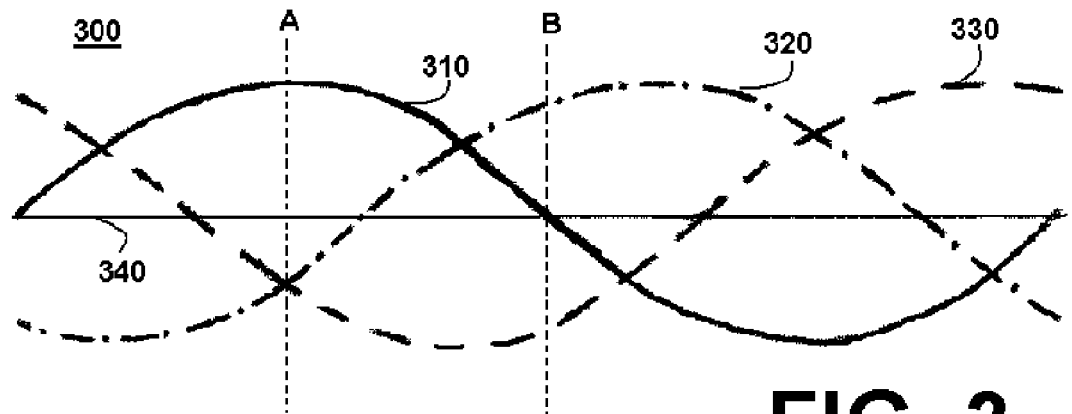
FIG. 3 is a graph illustrating three-phase current output over one output cycle.

FIG. 3 shows a graph 300 of three-phase current over one cycle of the VSI output. Graph 300 shows a first phase current 310 that may be the output for $I_1$ from node $N_{13}$ in FIG. 1, a second phase current 320 that may be the output for $I_2$ from node $N_{14}$ in FIG. 1, and a third phase current 330 that may be the output for $I_3$ from node $N_{15}$ in FIG. 1. Each of the phase currents has an associated phase voltage with a DC-offset 340, which in conventional VSI operation is typically zero. Graph 300 also shows two points in time for the purpose of discussion as point A and point B. In an exemplary embodiment, the VSI has an output at point A where current flows through $N_{13}$ to the motor at $I_1$ in one direction, and current flows in the opposite direction in the other two branches through $N_{14}$ and $N_{15}$, with the current flowing in one direction equal to the current flowing in the opposite direction. Current may be flowing through one switch and two diodes, or through two switches and one diode, or other combinations of switches and diodes. One component may have more current and therefore more thermal stress and temperature rise than the other components based on the amount of current passing through the component. At point B the current is primarily flowing through node $N_{14}$ and returning through node $N_{15}$, with current primarily flowing through one component in each branch while the current through $N_{13}$ and a component in that branch is carrying a small amount of current.

At low output frequency, such as when a motor is starting or operating at a slow speed, the VSI may experience a condition where one component reaches a thermal operating limit before the other components, causing a limitation of the overall current delivered. In one embodiment, the thermal stress is balanced between the components when these conditions are detected to increase output current capability. System controller 210, in the exemplary embodiment, balances thermal stress by determining an offset of the voltage levels of the three phases to change the level of DC-offset 340 so that the balance of current flowing through the components is shifted, and therefore the thermal stress on the components is shifted from one component to another. This may allow more than one component to operate at or near the operating limits so that the overall current delivered by the VSI is higher.

In some implementations, the maximum temperature rating of the switches (111-123) in the power switches are different from the maximum temperature rating of the diodes (D11-D23). The maximum output current using conventional methods with this configuration may therefore be limited by the component with the lowest maximum temperature rating. In the exemplary embodiment, the difference between the temperature ratings of the components may be correlated to a DC offset to balance the temperature rise between the components of the inverter branches and provide a higher output current. In one embodiment the DC offset is determined using a temperature profile for the switch and a temperature profile for the diode.

In one embodiment a temperature profile is a correlation between a rise in the component temperature and an output current. The temperature profile may further correlate the rise in component temperature to a DC offset. The correlations may be based on empirical data, or on known relationships between materials used in the component that affect temperature rise and may be stored in a look up table, or reduced to a relationship in a formula or algorithm. The switch temperature profile and the diode temperature profile may be correlated to each other to determine a DC offset for a desired output current. When operating the VSI, for example, a desired output current may be determined using conventional techniques. Using the desired output current and the correlated temperature profiles, a DC offset may be determined that provides a higher output current by shifting some of the thermal stress to the component that is not operating at its thermal limit. Balancing the temperature rise of the components relative to their thermal limits may result in an increase to the VSI output current capability at low output frequencies when the component operating temperatures are a limiting factor in the level of output current.

Figure 4:
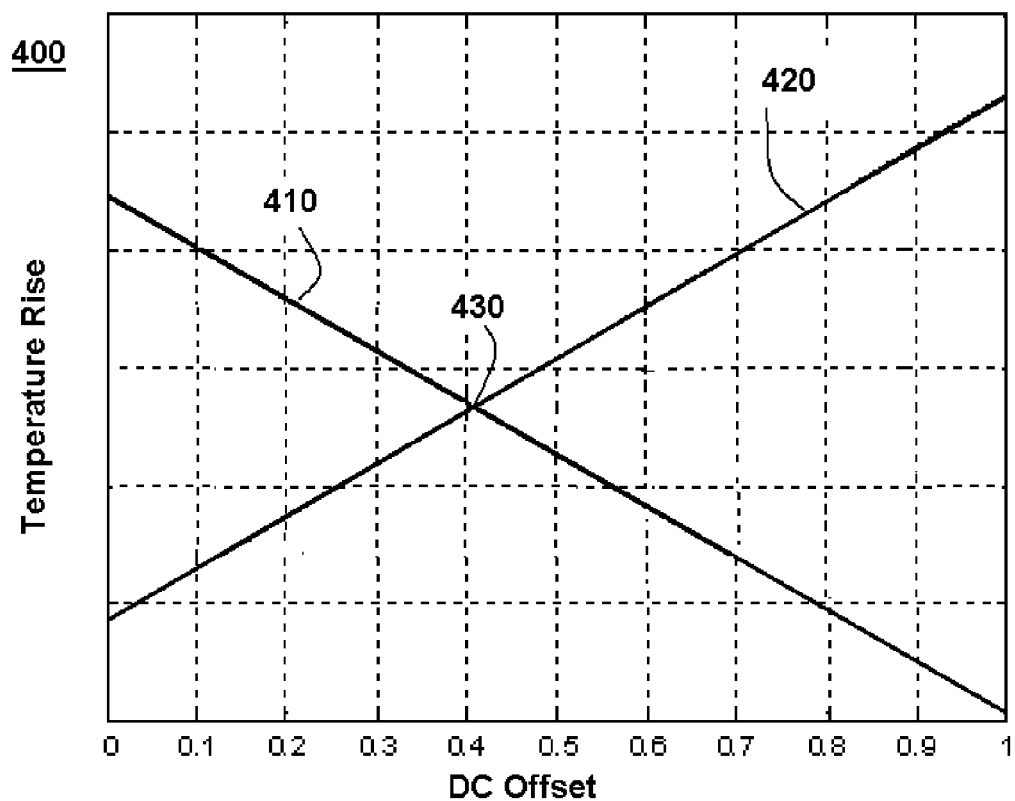
FIG. 4 is a graph illustrating a correlation between temperature profiles in an exemplary embodiment.

FIG. 4 shows a graph 400 from an exemplary embodiment with a diode temperature profile 410 correlated to a switch temperature profile 420. The temperature profiles 410 and 420 are expressed as a relationship of DC offset to temperature rise of the components. In graph 400, the DC offset is an offset for an exemplary embodiment utilizing a Space Vector Modulation (SVM) technique, with the offset added to the zero vector. In the exemplary SVM technique, a DC offset of 0.5 represents a condition with no offset applied, or equivalent to a VSI using a conventional SVM technique. Other embodiments may determine a DC offset using other pulse width modulation techniques. In the exemplary embodiment, a DC offset that is lower than 0.5 will result in lower voltage levels of the output phases of the VSI, and a DC offset that is higher than 0.5 will result in higher voltage levels. Graph 400 shows an exemplary correlation of temperature profiles for one output current requirement. In graph 400 exemplary temperature profiles are shown for an output current requirement of 400A. The relationships shown in FIG. 4 may be determined based on simulation or testing to obtain data to be used in a look-up table for operation of the VSI.

The correlated temperature profiles 410 and 420 have an intersection 430, which corresponds to a DC offset of about 0.41 in this example, meaning that in this example the output voltages of the phases would be lower than in conventional techniques. The components may have different temperature profiles for different levels of desired output current. In the exemplary embodiment the temperature profiles may be adjusted as part of the correlation process by multiplying or dividing one of the profiles by a factor. In the embodiment shown in graph 400, for example, switch temperature profile 420 is on a scale for the temperature rise that is 1.4 times the scale for diode temperature profile 410 based on the temperature range of an exemplary high temperature diode compared to the temperature range of an exemplary IGBT. An adjustment to the scale for the temperature rise may be determined based on the specific parameters of the components used in the VSI, such as operating junction temperature range, thermal resistance, and other factors. The DC offset may be useful to balance the temperature rise between the components of the VSI so that increased current from the VSI can be extracted.

The correlated temperature profiles are shown in graph 400 for the purpose of discussion, and may also be represented in any useful manner. In one embodiment the correlated temperature profiles are represented using a data table that is used during operation of the VSI to determine a DC offset. In an alternative embodiment the correlated temperature profiles are represented using an algorithm, or multiple algorithms that provide a DC offset for an output current requirement. In other embodiments a DC offset is determined using a combination of a data table and an algorithm.

In some embodiments the use of the DC offset increases the magnitude of current ripple in the output voltage. An increase to the switching frequency or a switching frequency offset may be used to reduce the magnitude of current ripple. Determination of an increase to the switching frequency or a switching frequency offset may be performed in any manner. In one embodiment, for example, a scale for adjusting the switching frequency may be calculated by taking the inverse ratio between the current ripple magnitude with the DC offset applied and the current ripple magnitude without the DC offset applied. The determination of the switching frequency may include determining a first switching frequency using pulse width modulation techniques such as conventional pulse width modulation techniques. Then a first current ripple magnitude for the first switching frequency without the DC voltage offset applied may be determined based on a data table or equations correlating the first switching frequency to current ripple magnitude. A second current ripple magnitude for the first switching frequency with the DC voltage offset applied may also be determined using a data table or equation that further correlates the current ripple magnitude to the DC voltage offset. The second switching frequency may be calculated based on the first switching frequency, the first current ripple magnitude, and the second current ripple magnitude, for example, by finding an inverse ratio between the second current ripple magnitude and the first current ripple magnitude, and multiplying the inverse ratio by the first switching frequency. In the exemplary embodiment the switching frequency is adjusted when the DC offset is applied to reduce current ripple to a similar level as in conventional pulse width modulation techniques. Other methods of determining a switching frequency to provide a suitable current ripple magnitude may be used.

Figure 5:
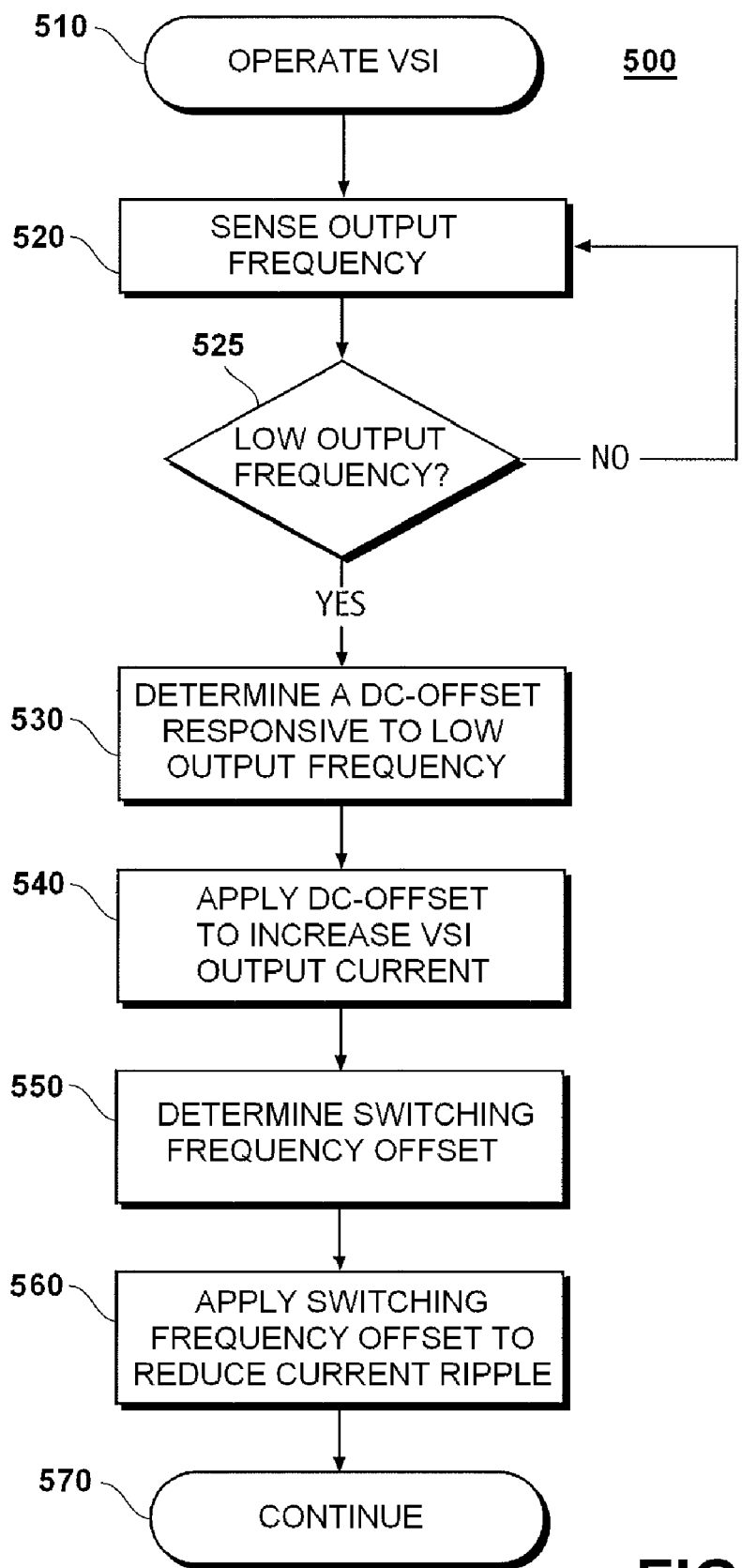
FIG. 5 is a flow diagram illustrating a method of operating a voltage source inverter using a voltage offset according to an exemplary embodiment.

FIG. 5 is a flow diagram illustrating a method for providing improved output current capability in a voltage source inverter utilizing a DC offset according to another embodiment of the present invention. FIG. 5 details an embodiment of a method 500 of operating a voltage source inverter (VSI). Method 500 may utilize one or more concepts detailed above.

Method 500 begins at block 510 while operating a VSI. First, an output frequency is sensed (Block 520). The output frequency may be the actual output frequency, or it may be an output frequency requirement based on operating conditions. The output frequency may be sensed using sensors, or sensed using software based on requirements and operating conditions to detect the output frequency. If the output frequency is a low output frequency condition (Block 525) then a DC-offset may be determined that is responsive to the low output frequency condition. In the exemplary embodiment, low frequency conditions occur when an electric motor is rotating at a very low speed or when the motor is at stand-still. The very low speed or stand-still conditions occur during vehicle start-up, such as, in an electric vehicle or during engine cranking in a hybrid vehicle starter-generator application.

Next, a DC offset responsive to the sensed low output frequency condition is determined (Block 530). In one embodiment, correlated temperature profiles for components of the VSI are used to determine the DC offset. An electrical current requirement may first be determined in any manner, such as using conventional methods. In the exemplary embodiment, the electrical current requirement may be used to obtain a first temperature profile for a component in a power switch of the VSI, and a second temperature profile for another component in the power switch. The first temperature profile and the second temperature profile may be correlated to determine the DC offset.

In the exemplary method, the determined DC offset is applied by changing pulse width used to drive an output voltage, and therefore the voltage level of each of the phases according to the DC-offset. Applying the DC-offset may increase the output current capability of the voltage source inverter (VSI) (Block 540). In one embodiment the DC offset is applied to each of the branches of the VSI after determining a voltage using conventional methods. The DC offset may allow increased current to be delivered from the VSI by balancing the temperature rise in the components such as an IGBT and a high temperature diode. By balancing the temperature rises in the exemplary embodiment, the temperature rise of one component will not be a limiting factor; rather the combined temperature rise of multiple components can determine the output current capability. In one embodiment, the DC-offset is applied as a zero voltage vector offset. A zero voltage vector offset may be used with space vector modulation techniques to apply an offset to the zero voltage vector.

In one embodiment, applying the DC-offset or the zero voltage vector offset increases a current ripple magnitude that is noise in the output current. In the exemplary embodiment, the output voltages are regulated and driven using pulse width modulation (PWM) with a switching frequency. The current ripple may be reduced by increasing the switching frequency. Increasing the switching frequency, however, may increase thermal stress on switches by operating the switches. A switching frequency offset may be determined (Block 550) that reduces the current ripple to a suitable level, and limits thermal stress due to an increased switching frequency to a suitable level. The DC-offset may be used to determine the switching frequency offset.

In one exemplary embodiment, the switching frequency offset is determined in the following manner. First a correlation between the DC-offset and current ripple is determined so that for a given DC-offset a rise in current ripple may be determined. A first switching frequency may be determined based on PWM techniques. In the exemplary method, a first current ripple magnitude is determined without the DC-offset applied and a second current ripple magnitude is determined with the DC-offset applied using the correlation between the DC-offset and current ripple. An offset or an adjusted switching frequency may be determined based on the ratio between the second current ripple magnitude and the first current ripple magnitude. The switching frequency, for example, may be determined by using an inverse ratio between the second current ripple magnitude and the first current ripple magnitude, and multiplying the first switching frequency by the inverse ratio to find a second switching frequency. Other methods of determining a switching frequency or switching frequency offset may be used in other embodiments to reduce current ripple. Once a suitable switching frequency is determined, the switching frequency may be applied to reduce current ripple (Block 560). In the exemplary embodiment the offset to the switching frequency is applied at the same time that the DC-offset is applied. The current ripple, therefore, may be reduced compared to an embodiment that does not increase the switching frequency. The exemplary method ends at block 570.

The above-described system and method for increased output current in a voltage source inverter is an example system and method. The system and method for increased output current in a voltage source inverter illustrate at least one possible approach for improving output current in a voltage source inverter. The actual implementation may vary from the package discussed. Moreover, various other improvements and modifications to this invention may occur to those skilled in the art, and those improvements and modifications will fall within the scope of this invention as set forth in the claims below.

The present invention may be embodied in other specific forms without departing from its essential characteristics. The described embodiments are to be considered in all respects only as illustrative and not restrictive.

While at least one exemplary embodiment has been presented in the foregoing detailed description, it should be appreciated that a vast number of variations exist. It should also be appreciated that the exemplary embodiment or exemplary embodiments are only examples, and are not intended to limit scope, applicability, or configuration in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

What is claimed is:

1. A method of operating a voltage source inverter having an output with multiple voltage phases having a DC voltage level, the method comprising:
   sensing a low output frequency condition;
   determining a DC voltage offset responsive to the low output frequency condition; and
   applying the DC voltage offset when operating the voltage source inverter resulting in a change to the DC voltage level of the multiple voltage phases.

2. The method of claim 1, wherein the voltage source inverter has a power switch comprising a first component and a second component, and wherein determining the DC voltage offset responsive to the low output frequency condition comprises:
   determining an electrical current requirement for the voltage source inverter;
   obtaining a first temperature profile related to the electrical current requirement for the first component;

obtaining a second temperature profile related to the electrical current requirement for the second component that corresponds to the first temperature profile for the first component;

correlating the first temperature profile and the second temperature profile to determine the DC voltage offset.

3. The method of claim 2, wherein the first temperature profile correlates a temperature rise for the first component to the electrical current requirement, and the second temperature profile correlates a temperature rise for the second component to the electrical current requirement.

4. The method of claim 2, wherein the first temperature profile correlates a temperature rise for the first component to the DC voltage offset, and the second temperature profile correlates a temperature rise for the second component to the DC voltage offset.

5. The method of claim 2 wherein the first temperature profile is represented with a first data set and the second temperature profile is represented with a second data set, wherein correlating the first temperature profile and the second temperature profile comprises comparing the first data set to the second data set.

6. The method of claim 2 wherein the first temperature profile is represented with a first equation related to electrical characteristics of the first component, and the second temperature profile is represented with a second equation related to electrical characteristics of the second component, wherein correlating the first temperature profile and the second temperature profile comprises solving the first equation and the second equation.

7. The method of claim 2 wherein the first component is an insulated gate bipolar transistor, and wherein the second component is a high temperature diode.

8. The method of claim 1 wherein the DC voltage offset is applied by changing digital values representing voltage levels that are applied using a pulse width modulation technique.

9. The method of claim 1 further comprising:

driving output voltages using pulse width modulation with a switching frequency;

determining the switching frequency based on the DC voltage offset to reduce current ripple in the output voltages.

10. The method of claim 9 wherein determining the switching frequency comprises:

determining a first switching frequency using the pulse width modulation;

determining a first current ripple magnitude for the first switching frequency without the DC voltage offset applied;

determining a second current ripple magnitude for the first switching frequency with the DC voltage offset applied; and calculating a second switching frequency based on the first switching frequency, the first current ripple magnitude, and the second current ripple magnitude.

11. The method of claim 10 wherein calculating the second switching frequency further comprises determining an inverse ratio between the second current ripple magnitude and the first current ripple magnitude, and multiplying the inverse ratio by the first switching frequency.

12. The method of claim 1 wherein the voltage source inverter is configured to drive a three-phase motor.

13. The method of claim 12 wherein the three-phase motor is used in a vehicle.

14. The method of claim 1 wherein the voltage source inverter is operated using a space vector modulation technique with a zero vector, and the DC voltage offset is determined as an offset to the zero vector.

15. A method of thermal management in a voltage source inverter with an output current wherein the voltage source inverter comprises multiple components comprising switches having a first thermal limit, and diodes having a second thermal limit, the method comprising:

detecting a low output frequency condition corresponding to one of the multiple components operating at a temperature that limits the output current;

determining a zero voltage vector offset responsive to the low output frequency condition; and applying the zero voltage vector offset to balance a switch temperature relative to the first thermal limit with a diode temperature relative to the second thermal limit.

16. The method of claim 15 wherein determining the zero voltage vector offset comprises:

determining an output current requirement for the voltage source inverter;

obtaining a first temperature profile for the multiple switches relative to the output current requirement;

obtaining a second temperature profile for the multiple diodes relative to the output current requirement;

correlating the first temperature profile and the second temperature profile to the zero voltage vector offset.

17. The method of claim 15 further comprising: regulating output voltages using pulse width modulation with a switching frequency; determining a switching frequency offset based on the zero voltage vector offset; and applying the switching frequency offset to reduce current ripple in the output voltages.

18. A voltage source inverter comprising:

a set of inverter branches, each branch comprising a set of switches and a set of diodes and each branch configured to provide a phase of a modulated output voltage with a DC voltage level;

a voltage source inverter control comprising:

a system controller configured to determine a low output frequency condition, to determine a DC voltage offset responsive to the low output frequency condition, and to apply the DC voltage offset resulting in a change to the DC voltage level of the modulated output voltages during the low output frequency condition;

switch controllers communicatively coupled to the system controller and configured to operate the set of switches in the set of inverter branches using a pulse width modulation technique; and a data source communicatively coupled to the system controller.

19. The voltage source inverter of claim 18 wherein the modulated output voltages each have a high peak and a low peak and wherein the DC voltage level of the modulated output voltages is approximately equal to an average of the high peaks and the low peaks.

20. The voltage source inverter of claim 18 wherein the set of switches are insulated gate bipolar switches, and wherein the set of diodes are high temperature diodes.

* * * * *